Figure 1:
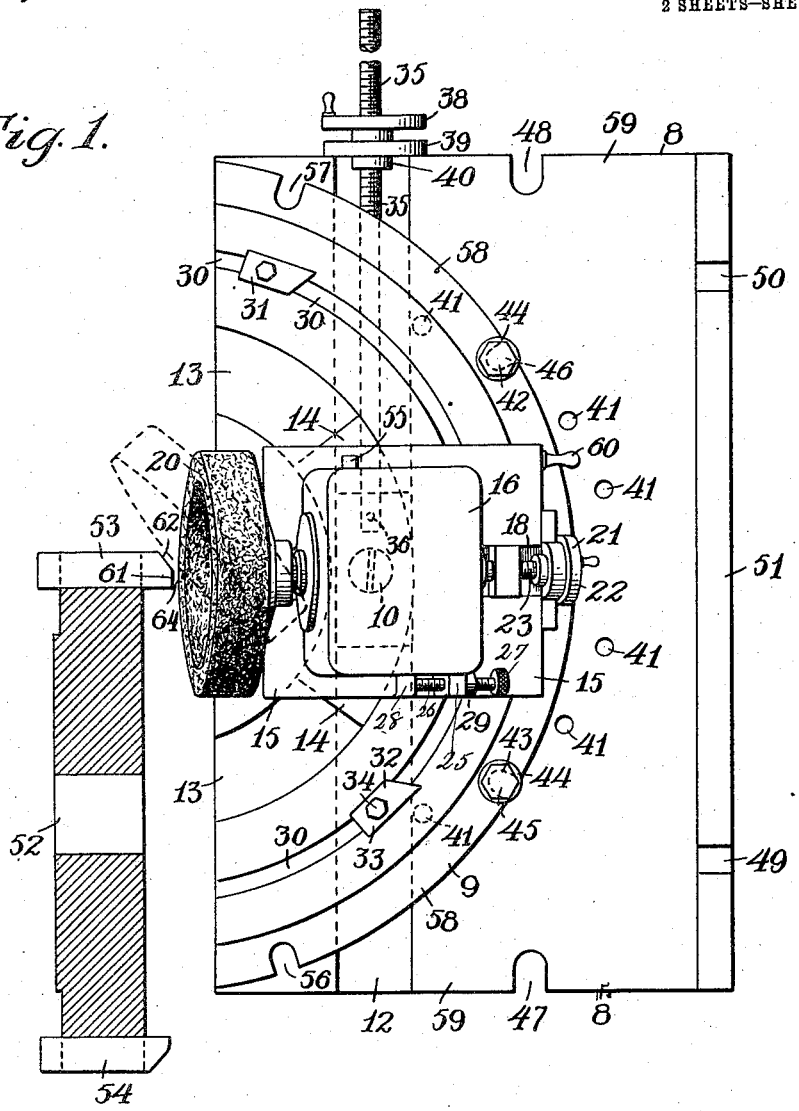

H. C. WILLIAMSON.
GRINDING MACHINERY.
APPLICATION FILED APR. 3, 1909.

1,046,527.

Patented Dec. 10, 1912.

2 SHEETS—SHEET 1.

Witnesses.
R. D. Tolman
A. H. Neilson

Inventor
Herbert C. Williamson
By Hartley W. Bartlett
Attorney.

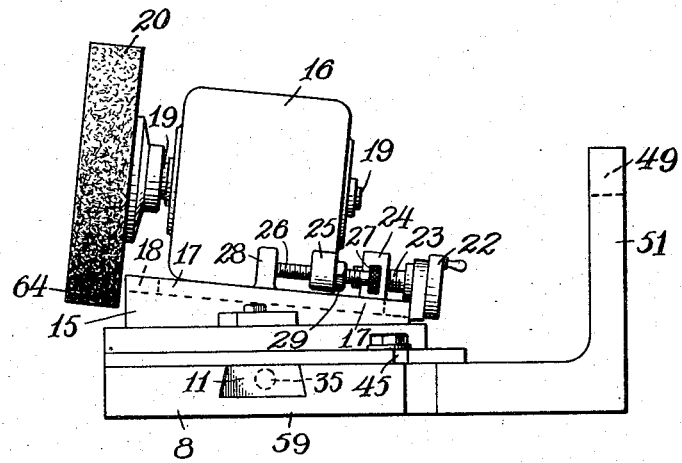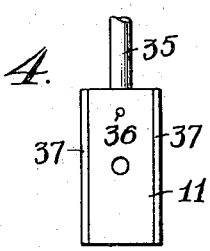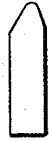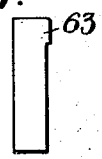

UNITED STATES PATENT OFFICE.

HERBERT C. WILLIAMSON, OF WORCESTER, MASSACHUSETTS.

GRINDING MACHINERY.

1,046,527.      Specification of Letters Patent.      Patented Dec. 10, 1912.

Application filed April 3, 1909. Serial No. 487,755.

*To all whom it may concern:*

Be it known that I, HERBERT C. WILLIAMSON, a citizen of the United States, residing at Worcester, in the county of Worcester, State of Massachusetts, have invented a certain new and useful Improvement in Grinding Machinery, of which the following is a specification, reference being had therein to the accompanying drawings.

This invention relates to grinding machines, but more particularly to such as are used to sharpen inserted tooth cutters of the face mill type, and inserted tooth reamers.

Heretofore, it has been necessary to remove the cutter from the machine in order to grind the teeth. Not only does this necessitate a considerable expenditure of time and labor, but it is extremely difficult to replace the cutter so that the teeth cut evenly. In the present invention, a portable machine has been devised which may be placed upon the bed of any milling machine, and adjusted to grind the teeth without removing the cutter.

An important feature of this device is that it is not mounted upon or set relative to a fixed pivot or center, as has been the case in machines of this class heretofore known. The center of the arc in which the grinding element swings, may be placed in any desired position relative to the work. This allows the grinding of a considerable number of forms which could not have been produced upon fixed center machines.

Further features of this machine are that it may be set to grind the teeth on either a horizontal or vertical spindle cutter, that it may be adjusted to grind any style of tooth used in a face mill, that the bed plate of the grinder may be swung to any desired angle relative to the face of the cutter, that adjustable means are provided for limiting the advance of the grinding wheel, that adjustable means are provided for limiting the travel of the grinder in the guide slots, that the grinder is set at an angle with the plane of the bed plate, that the bed plate is capable of longitudinal adjustment, that the tooth is ground to its desired shape with or by one sweep of the wheel, and numerous others which will be hereinafter shown and described.

One embodiment of the invention is shown in the drawings in which:—

Figure 2:
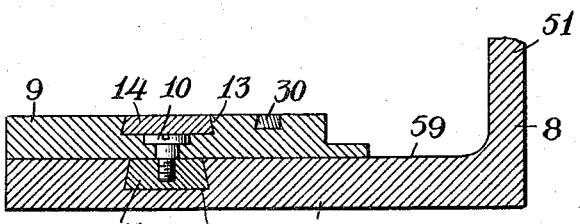

Figure 1, is a plan view of the invention complete. Fig. 2, a transverse center section of the bed plate and angle iron showing the method of connecting these, as will be described hereinafter. Fig. 3, a side elevation. Fig. 4, a view of the pivot block detached, as will be described hereinafter. Figs. 5, 6 and 7 some types of cutter teeth which may be ground by the device, as will be described hereinafter.

In the drawings, the device comprises an angle iron 8 upon which rests a bed plate 9, fastened to the angle iron by means of the pivot pin 10 which is attached to a block 11 seated in the slot 12 of the angle iron 8. In this bed plate 9 is a circular slot 13 in which operates the block 14, upon which is carried the plate 15 which supports the motor 16. These slots are preferably beveled or inverted T shaped to retain the blocks.

The motor 16 is preferably constructed with a flange 17 operating in a beveled slot 18 in the plate 15. Upon the shaft 19 of the motor 16 is secured the grinding wheel 20. To the rear edge of the block 15 is attached an adjusting mechanism 21 for advancing or withdrawing the grinding wheel from the work. This mechanism is here shown provided with a hand wheel 22 which is rigidly fastened to the adjusting screw 23 which passes through a tapped hole in the block 24, carried by the flange 17 of the motor 16.

Upon one side of the motor is placed an adjustable stop to regulate the advance of the grinding wheel, consisting of a lug 25 upon the motor 16 through which passes an adjusting screw 26, provided at its rearward extremity with a knurled nut 27, and acting against the post 28 upon the plate 15. A lock nut 29 is placed upon this screw 26.

In the plate 9 is a beveled circular slot 30 preferably constructed with the same center as the slot 13. In this slot 30 are seated the adjustable stops 31 and 32. These stops are of the usual type with a block seated in the slot to which is fastened the plate 33 by means of the bolt 34, and which may be set at any point of the slot to regulate the travel of the grinder.

To the block 11 is attached one extremity of the adjusting screw 35 by means of the pin 36. This block is provided with beveled edges 37 to hold it in the slot 12. At one extremity of this slot 12 is fastened to the angle iron 8 the adjusting device 38 of the usual type in which the wheel is secured to the plate 39 by having its hub pass through this plate and a collar 40 placed thereon. The adjusting screw passes through a tapped hole in the center of this hub, so that the turning of the hand wheel advances or withdraws the adjusting screw 35. As this block is attached to the bed plate 9 by means of the pivot pin 10, it may readily be seen that operation of this adjusting means will cause the plate 9 to slide longitudinally on the angle iron.

As the plate 9 is pivotally connected to the angle iron 8, this plate is free to revolve thereon. To lock this plate to the angle iron, threaded holes 41 are cut in the iron to contain bolts 42 and 43 provided with washers 44, these bolts being set in recesses 45 and 46 in the plate 9. The angle iron 8 is provided with recesses 47 and 48 to contain bolts to fasten this plate to the work table of a milling machine, or other base upon which the grinder may be placed. Similar recesses 49 and 50 are located upon the edge of the plate 51 of the angle iron 8. When it is desired to grind horizontally, the angle iron 8 is laid flat upon the table and fastened by means of bolts set in the recesses 47 and 48, but, for vertical grinding, the device is turned so that it rests upon the plate 51 of the angle iron, and is fastened to the table by means of bolts acting in the recesses 49 and 50.

To illustrate the grinding of an inserted tooth cutter, a center section of such an article is shown in Fig. 1, and designated 52. Only the two teeth 53 and 54 located at the section are shown in the figure, and these each have a different form of face to illustrate some of the great variety which may be produced by this grinder.

To obtain clearance on the face of the teeth, the slot 18 in which the motor slides, and the top face of the plate 15 slope downward toward the rear at an angle preferably of from seven to ten degrees with the bed plate, so that the motor is maintained at this angle. Numerous other forms of construction might be adopted to thus maintain the motor, as may readily be seen.

This device is here shown provided with a motor, though it should be clearly understood that any other suitable means of transmission of power to the grinding wheel might be adopted. The current is introduced in this motor at the point 55, and the device is adapted to be connected to an ordinary electric light socket by means of a flexible cord.

The guide slot 13 and the slot 30 are concentric with the center of curvature preferably at a point slightly in front of the forward edge of the bed plate. This center is preferably the limit of advance of the grinding wheel. At this point, the face of the wheel merely turns about its axis as the block 15 is swung on the bed plate 9. As the wheel is withdrawn, the face describes a curve of increasing radius.

If the device is to be used for horizontal grinding only, the angle iron 8 may be removed by swinging the block 14 until it uncovers the pivot pin 10, and unscrewing this pin. The recesses 56 and 57 may be then used to fasten the bed plate to the table on which it is set.

To dispense with unnecessary weight, the bed plate has been cut away to form a flange 58. The recesses 46, 46, 56 and 57 are cut in this flange. If the angle iron is removed, these recesses 45 and 46 may be used for the same purpose as recesses 56 and 57.

To sharpen a horizontal spindle cutter of a milling machine, place the device upon the table of the machine, taking care to locate the grinding wheel as nearly as possible to its proper position in front of the cutter, and fasten the base plate 59 of the angle iron 8 to the table by means of bolts set in the recesses 47 and 48. If the grinding wheel is to one side of the face of the tooth, it may be adjusted by means of the screw 35, or by moving the table. Grasp the handle 60 and swing the block 15 to the left, the guide block 14 acting in the curved slot 13, until the proper initial position of the grinding wheel is reached. Move the adjustable stop 32 until it comes in contact with the block 15 and lock it there. Having started the revolution of the grinding wheel, advance it toward the face of the tooth by means of the adjusting device 21. The block 15 is then swung to the right by means of the handle 60 until the tooth has been completely ground. The adjusting screw 26 should be advanced until it strikes the post 28 and locked there by the nut 29, while the grinding of the first tooth of the cutter is progressing, so that the wheel may be withdrawn at the end of this operation, and then instantly returned to the same position to grind the second and succeeding teeth. To grind the tooth 53, the wheel would be advanced in the position shown by solid lines to grind the face 61, and then swung into the dotted position to grind the face 62.

When the wheel is in the latter position, the stop 31 should be moved against the edge of the plate 15, so that the succeeding teeth may be ground the same as the first.

To grind a vertical spindle cutter, turn the device to a vertical position with the plate 51 resting on the table of the machine, and fasten by means of bolts in recesses 49 and 50, having been careful to properly locate the grinding wheel. The grinding is the same as with a horizontal spindle cutter.

If it is desired to sharpen a tooth such as is shown in Fig. 7, it would be necessary to swing the plate 15 so far around to grind the face 63 that a large portion of this plate would be off the bed plate, were the latter to remain in the position shown in Fig. 1. To prevent this, the bolts 42 and 43 should be removed, the bed plate swung on its pivot 10 a sufficient distance and the bolts set in the nearest hole 41. The guide slot 13 would then extend beyond the front edge of the plate 59 and the plate 15 would be well supported in its extreme position.

A guide finger of the usual adjustable type found in grinding machines could be used with this machine in order to hold each tooth of the cutter in its proper position in front of the wheel during the grinding. In the type of wheel shown in the drawings, the grinding would preferably be done on the lower portion 64 of the face of the wheel.

It may readily be seen that the type of angle iron herein shown and described, might be varied to allow the grinder to operate other than vertically and horizontally.

It should be clearly understood that the invention is not limited to the particular construction and arrangement of parts herein shown and described, as numerous modifications might be made without departing from the scope of the invention.

What I claim as my invention and desire to secure by Letters Patent is:—

1. In a device of the class described, the combination with a bed plate having a slot in the arc of a circle, a wheel support movable in said slot, a grinding wheel journaled in said support, with the center of said arc on the face side of said grinding wheel.

2. In a device of the class described, the combination with a support, of a grinding wheel rotatably mounted on said support, means on said support arranged to move in the arc of a circle and to support said grinding wheel upon the interior of said arc, with the axis of said circle arranged to be on the face side of said grinding wheel.

3. In a device of the class described, the combination with a support, of a grinding wheel rotatably mounted on said support, and means on said support for swinging the face of said grinding wheel upon the circumference of concentric arcs of different radii.

4. In a device of the class described, the combination with a support, of a grinding wheel rotatably mounted on said support, means on said support arranged to move in the arc of a circle and to support said grinding wheel upon the interior of said arc, with the axis of said circle arranged to be on the face side of said grinding wheel, and means for moving said grinding wheel longitudinally on the radius of said arc.

5. In a device of the class described, a bed, a grinding wheel mounted upon a block sliding in a slot in an arc of a circle in said bed, the center of the circle being the center of the arc which is to be ground, adjustable means for limiting the travel of the block in this slot, and means for rotating the grinding wheel.

6. In a device of the class described, a bed, a grinding wheel, a block sliding in a slot in an arc of a circle in said bed, the center of the circle being the center of the arc which is to be ground, a slot running radially in said block, a carriage sliding in said slot upon which is mounted said grinding wheel, means for moving said carriage toward or from said center, and means for rotating said wheel.

7. In a device of the class described, a bed plate, a grinding wheel, a block sliding in a slot in an arc of a circle in said bed plate, the center of the circle being the center of the arc which is to be ground, a slot running radially in said block, a carriage sliding in said slot, upon which is mounted said grinding wheel, means for moving said carriage toward or from said center, adjustable means for limiting the advance of said carriage in said slot, and means for rotating said wheel.

8. In a device of the class described, a support, a grinding wheel mounted upon a block sliding in a slot in an arc of a circle in said support, the center of this arc being movable relative to the work, means for adjusting the grinding wheel radially of the circle, and means for rotating said wheel.

9. In a device of the class described, a bed, a grinding wheel, an electric motor mounted upon a block sliding in a slot in an arc of a circle in said bed, the center of the circle being the center of the arc which is to be ground, the shaft of said motor being set radially of said circle, and the grinding wheel fastened upon this shaft.

10. In a device of the class described, a bed plate, a grinding wheel, an electric motor mounted upon a block sliding in a slot in an arc of a circle in said bed plate, the center of the circle being the center of the arc which is to be ground, the shaft of said motor being set radially of said circle and at an angle with the plane of the bed plate, and the grinding wheel fastened upon this shaft.

11. In a device of the class described, the combination with an angle iron, a bed plate pivotally connected on said angle iron and capable of a reciprocating movement thereon, said bed plate having a slot in the arc of a circle, a wheel support movable in said slot, a grinding wheel journaled in said support, with the center of said arc on the face side of said grinding wheel and with said wheel support movable longitudinally on the radius of said arc.

In testimony whereof I affix my signature in presence of two witnesses.

HERBERT C. WILLIAMSON.

Witnesses:
ALMA H. NEILSON,
HARTLEY W. BARTLETT.

Copies of this patent may be obtained for five cents each, by addressing the "Commissioner of Patents, Washington, D. C."